United States Patent
Bordin et al.

(10) Patent No.: US 12,371,373 B2
(45) Date of Patent: Jul. 29, 2025

(54) FIBER CEMENT PRODUCTS AND METHODS FOR THE PRODUCTION THEREOF

(71) Applicant: ETEX SERVICES NV, Kapelle-op-den-Bos (BE)

(72) Inventors: Ruben Bordin, Mechelen (BE); Bertrand Van Acoleyen, Kapelle-op-den-Bos (BE)

(73) Assignee: ETEX SERVICES NV, Kapelle-op-den-Bos (BE)

( * ) Notice: Subject to any disclaimer, the term of this patent is extended or adjusted under 35 U.S.C. 154(b) by 848 days.

(21) Appl. No.: 17/640,989

(22) PCT Filed: Oct. 4, 2018

(86) PCT No.: PCT/EP2018/077049
§ 371 (c)(1),
(2) Date: Mar. 7, 2022

(87) PCT Pub. No.: WO2019/068829
PCT Pub. Date: Apr. 11, 2019

(65) Prior Publication Data
US 2022/0332643 A1   Oct. 20, 2022

(30) Foreign Application Priority Data
Oct. 6, 2017   (EP) ..................... 17195275

(51) Int. Cl.
*C04B 18/24*     (2006.01)
*B28B 1/52*      (2006.01)
(Continued)

(52) U.S. Cl.
CPC ............ *C04B 18/243* (2013.01); *B28B 1/522* (2013.01); *B28B 1/525* (2013.01); *C04B 14/06* (2013.01);
(Continued)

(58) Field of Classification Search
CPC .... B29C 2045/0006; B29C 2045/0008; B29C 2045/1723; B29C 45/0005;
(Continued)

(56) References Cited

U.S. PATENT DOCUMENTS 3,147,177 A  9/1964  Owens et al.
5,188,889 A  2/1993  Nagatomi et al.
(Continued)

FOREIGN PATENT DOCUMENTS

DE    4233208 A1    4/1994
DE    102004063271 A1    7/2006
(Continued)

OTHER PUBLICATIONS

Sakota H et al., "Fiber-Reinforced Cement Articles," Chemical Abstracts, Chemical Abstracts Service (C A S), US, vol. 110, No. 9, May 1, 1989 (May 1, 1989), p. 340.

*Primary Examiner* — Stella K Yi
(74) *Attorney, Agent, or Firm* — Dilworth & Barrese, LLP; Michael J. Musella, Esq.

(57) ABSTRACT

The present invention relates to fiber cement products comprising an inner core material, which inner core material is covered by at least one outer surface layer, characterized in that:—said inner core material has a density of between about 0.4 and about 0.9 g/cm³ inclusive, and at least comprises cement and between 1 wt % and 70 wt % (with respect to the total dry weight of said inner core material) of a lightweight filler, and—said at least one outer surface layer has a density of between about 0.9 and about 1.4 g/cm³ inclusive, and at least comprises fibers and cement.

16 Claims, 2 Drawing Sheets

(51) Int. Cl.
*C04B 14/06* (2006.01)
*C04B 14/18* (2006.01)
*C04B 28/02* (2006.01)
*C04B 40/00* (2006.01)

(52) U.S. Cl.
CPC ............ *C04B 14/185* (2013.01); *C04B 28/02* (2013.01); *C04B 40/0064* (2013.01)

(58) Field of Classification Search
CPC .......... B29C 45/14786; B29C 65/3408; B29C 66/721; B29C 66/7212; B29C 66/7214; B29C 66/72141; B29C 66/72143; B29C 67/242; B29C 67/248; B29C 70/081; B29C 70/30; B29C 70/62
See application file for complete search history.

(56) References Cited

U.S. PATENT DOCUMENTS

| | | |
|---|---|---|
| 2011/0023397 A1 | 2/2011 | Charvoz |
| 2018/0291634 A1* | 10/2018 | Suput ................ E04F 13/0866 |

FOREIGN PATENT DOCUMENTS

| | | |
|---|---|---|
| EP | 0340620 A2 | 11/1989 |
| EP | 0585665 A1 | 3/1994 |
| EP | 1686220 A1 | 8/2006 |
| FR | 1248090 A | 12/1960 |
| FR | 3026759 A1 | 4/2016 |
| GB | 1162518 A | 8/1969 |
| WO | 02/31287 A1 | 4/2002 |
| WO | 2016/102116 A1 | 6/2016 |

* cited by examiner

FIBER CEMENT PRODUCTS AND METHODS FOR THE PRODUCTION THEREOF

FIELD OF THE INVENTION

The present invention relates to fiber cement products comprising an inner core material, which inner core material is covered by at least one outer surface material. The present invention further relates to methods for the production of these fiber cement products as well as to uses of these fiber cement products in the building industry.

BACKGROUND OF THE INVENTION

Fiber cement products, essentially consisting of water, cement and fibers, have been used for buildings since the nineteenth century and have a typical density of between about 1.2-1.7 $g/cm^3$. The variation in density is achievable by compression and dewatering of the fiber cement slurries used in manufacture and by varying the amount of fibers used. At these densities, the cement based matrix has few voids, which results in lower water absorption which has usually been considered necessary for good durability performance of cement matrices.

Typical fiber cement products are thus heavier than timber-based products of equal dimensions and therefore have a reduced workability. Workability encompasses the ease with which the board is handled and installed. Therefore, fiber cement building products are more difficult to cut, machine and nail than timber and timber-based products. In this regard, the density of natural timber sheets typically ranges from about 0.7-0.9 $g/cm^3$ for dry hardwoods and from about 0.38-0.6 $g/cm^3$ for dry softwoods.

Thus, a density-modified fiber cement material with a density similar to timber may be expected to improve workability and enable lighter, more nailable, easier to cut and easier to machine products to be manufactured.

However, this would have to be achieved while retaining the mechanical performance, durability, fire resistant, rot proof and water resistant properties of fiber cement if the density modified fiber cement is to be used in the same range of applications.

The prior art describes how low-density additives can be introduced as density modifiers in the cementitious matrix of fiber cement materials. Low density additives for fiber cement products are defined as having a loose bulk density of about 0.8 $g/cm^3$. The density modification of cement-based materials with such inorganic particles is primarily achieved by introducing porosity into the material. Typically, the pore spaces are filled with water when the material is submerged in water or exposed to rain for a length of time. Nevertheless, low-density additives affect the moisture resistance, freeze-thaw resistance and mechanical properties when introduced into a cementitious product.

SUMMARY OF THE INVENTION

An object of the present invention is to provide lightweight fiber cement building materials having an improved workability while retaining a good mechanical performance and good water-resistant properties.

In this respect, the present inventors have achieved to develop fiber cement products containing at least two different fiber cement materials. In particular, the fiber cement products of the present invention have an inner core, which is made of a low density fiber cement composition comprising at least one lightweight filler. This inner core is covered (i.e. essentially completely surrounded) by an outer surface layer, which is made of a fiber cement composition having a medium to high density. The weight of the fiber cement products of the present invention is therefore significantly reduced whereas the mechanical and water-resistant properties are the same or even improved when compared to fiber cement products known in the art.

Accordingly, the present invention provides a novel lightweight fiber cement building material with improved workability, dimensional stability and good mechanical performance, characterized in that low density is achieved by the presence of a lightweight material in the core of the material.

In a first aspect, the present invention provides fiber cement products comprising an inner core material, which inner core material is covered by at least one outer surface layer, characterized in that:
  the inner core material at least comprises cement and a lightweight filler and has a density of between about 0.4 and about 0.9 $g/cm^3$ inclusive, and
  the at least one outer surface layer at least comprises fibers and cement and has a density of between about 0.9 and about 1.4 $g/cm^3$ inclusive.

In particular embodiments, the present invention provides fiber cement products comprising an inner core material, which inner core material is covered by at least one outer surface layer, characterized in that:
  the inner core material at least comprises cement and a lightweight filler and has a density of between about 0.4 and about 0.9 $g/cm^3$, and
  the at least one outer surface layer at least comprises fibers and cement and has a density of between about 1.0 and about 1.4 $g/cm^3$ inclusive.

In particular embodiments, the fiber cement products according to the present invention are flat multi-layered fiber cement products comprising at least one layer of an inner core material, which is covered on at least both of its largest opposite surfaces by at least one outer surface layer, characterized in that:
  the inner core material at least comprises cement and a lightweight filler and has a density of between about 0.4 and about 0.9 $g/cm^3$ inclusive, and
  the at least one outer surface layer at least comprises fibers and cement and has a density of between about 0.9 and about 1.4 $g/cm^3$ inclusive.

In yet further particular embodiments, the fiber cement products according to the present invention are flat multi-layered fiber cement products comprising at least one layer of an inner core material, which is covered on at least both of its largest opposite surfaces by at least one outer surface layer, characterized in that:
  the inner core material at least comprises cement and a lightweight filler and has a density of between about 0.4 and about 0.9 $g/cm^3$ inclusive, and
  the at least one outer surface layer at least comprises fibers and cement and has a density of between about 1.0 and about 1.4 $g/cm^3$ inclusive.

In particular embodiments, the inner core material of the fiber cement products according to the present invention further comprises fibers.

In particular embodiments, the fiber cement products according to the present invention are characterized in that they comprise between about 15% and about 95% of the inner core material in respect of the total volume of said fiber cement product.

In further particular embodiments, the fiber cement products according to the present invention are characterized in that the inner core material comprises a lightweight filler in an amount of between 5 wt % and 70 wt % with respect to the total dry weight of the inner core material.

In particular embodiments, the fiber cement products according to the present invention are characterized in that the inner core material comprises a lightweight filler, which is a lightweight aggregate, such as but not limited to a lightweight aggregate, a masonry-lightweight aggregate and/or a structural lightweight aggregate. In further particular embodiments, the inner core material comprises a lightweight aggregate. In yet further particular embodiments, the fiber cement products according to the present invention are characterized in that the inner core material comprises a lightweight filler, which is chosen from the group consisting of expanded perlite, expanded vermiculite, expanded polystyrene, extruded polystyrene, foam, concrete foam, calcium silicate hydrate gel (CSH gel), microspheres, cenospheres (ceramic microspheres), alkali resistant expanded glass spheres/beads, expanded shale, and xonotlite.

In particular embodiments, the fiber cement products according to the present invention are characterized in that the inner core material comprises fibers in an amount of between 0 wt % and 5 wt % with respect to the total dry weight of the inner core material. In further particular embodiments, the fibers in the inner core material of the fiber cement products according to the invention comprise cellulose fibers.

In further particular embodiments, the fiber cement products according to the present invention are characterized in that the inner core material comprises chemical pulps (example: from Kraft process).

In further particular embodiments, the fiber cement products according to the present invention are characterized in that the inner core material comprises mechanical pulps (Stone groundwood, TMP—Thermo Mechanical Pulp, CTMP—Chemi Thermo Mechanical Pulp . . . ) as it can be found in a recycled furnish.

In further particular embodiments, the fiber cement products according to the present invention are characterized in that the inner core material comprises recycled fiber cement waste, such as recycled autoclaved fiber cement waste, recycled air-cured fiber cement waste and/or milled or ground fiber cement waste.

In particular embodiments, the fiber cement products according to the present invention are characterized in that the at least one outer surface layer comprises fibers in an amount of between 6 wt % and 10 wt % with respect to the total dry weight of the at least one outer surface layer. In further particular embodiments, the fibers in the at least one outer surface layer of the fiber cement products according to the invention comprise cellulose fibers.

In a second aspect, the present invention provides methods for the production of fiber cement products as defined herein, at least comprising the steps of:
 i) Providing a first cementitious material at least comprising cement and a lightweight filler and having a density of between about 0.4 and about 0.9 g/cm$^3$ inclusive,
 ii) Providing a second fiber cement material at least comprising fibers and cement and having a density of between about 0.9 and about 1.4 g/cm$^3$ inclusive, and
 iii) Assembling the first cementitious material and the second fiber cement material so as to obtain a fiber cement product comprising an inner core made of the first cementitious material, which inner core is covered by at least one outer surface layer made of the second fiber cement material.

In particular embodiments, the present invention provides methods for the production of fiber cement products as defined herein, at least comprising the steps of:
 i) Providing a first cementitious material at least comprising cement and a lightweight filler and having a density of between about 0.4 and about 0.9 g/cm$^3$ inclusive,
 ii) Providing a second fiber cement material at least comprising fibers and cement and having a density of between about 1.0 and about 1.4 g/cm$^3$ inclusive, and
 iii) Assembling the first cementitious material and the second fiber cement material so as to obtain a fiber cement product comprising an inner core made of the first cementitious material, which inner core is covered by at least one outer surface layer made of the second fiber cement material.

In particular embodiments, the methods according to the present invention further comprise the step of curing the obtained fiber cement product.

In a third aspect, the present invention provides uses of a fiber cement product as defined herein as a building product. In particular embodiments, the fiber cement products of the present invention can be used to provide an outer surface to walls, both internal as well as external, a building or construction, indoor ceilings and semi-exposed ceilings e.g. as façade plate, siding, tile backer board, internal partition board, . . . etc.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
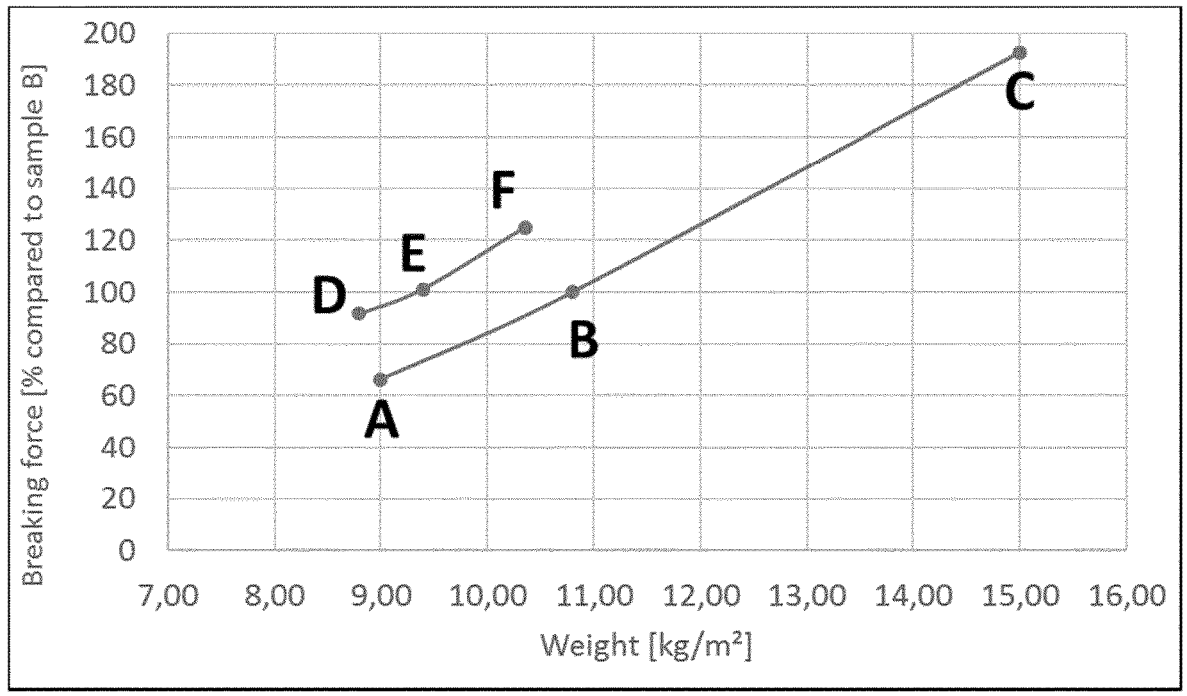
FIG. 1 shows the breaking force in Newton, which is needed to break multi-layered structures produced according to the methods of the invention and a conventional monolayered structure in function of the weight in kg/m$^2$.

The present invention will be described with respect to particular embodiments.

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

"At least one" as used herein when referring to parts, entities, constituents, components, elements, objects etc. is intended to be construed as one or more parts, entities, constituents, components, elements, objects etc., such as one, two, three, four, five, six, seven, eight, nine, ten, or more parts, entities, elements, objects etc.

"A part" as used herein refers to an entity, constituent, component, element and/or object of a larger whole comprising two or more entities, constituents, components, elements and/or objects.

"At least one part of material" as used herein, such as for example in the expressions "at least one part of lightweight material" or "at least one part of fiber cement material", means that one or more parts of are made from or are consisting of this material. In this respect, "at least one part of lightweight material" means that one or more parts of a larger multi-part whole are made from or are consisting of lightweight material. In the same way, "at least one part of fiber cement material" means that one or more parts of a larger multi-part whole are made from or are consisting of fiber cement material.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, lightweight fillers and other additives. In the context of the processes of the present invention, the fiber cement slurry can thus be provided by one or more sources of at least cement, water and fibers. Optionally, these one or more sources of at least cement, water and fibers may operatively be connected to a continuous mixing device constructed so as to form a cementitious fiber cement slurry.

In particular embodiments, when using cellulose fibers or the equivalent of waste paper fibers, a minimum of about 2 wt %, such as at least about 3 wt %, such as at least about 4 wt % of these cellulose fibers (compared to the total initial dry weight of the slurry) may be used. In further particular embodiments, when exclusively cellulose fibers are used, between about 4 wt % to about 12 wt %, such as more particularly, between about 7 wt % and about 10 wt % of these cellulose fibers (compared to the total initial dry weight of the slurry) may be used. If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-module fibers, such as polypropylene, polyvinyl acetate, polycarbonate or acrylonitrile fibers the proportion can be lower than the proportion of the replaced cellulose fibers. The fineness of the fibers (measured in Shopper-Riegler degrees) is in principle not critical to the processes of the invention. Yet in particular embodiments, where autoclave-cured fiber cement products are envisaged, it has been found that a range between about 15 DEG SR and about 45 DEG SR can be particularly advantageous for the processes of the invention.

"Fiber(s)" present in the fiber cement products or fiber cement slurry as described herein may be for example process fibers and/or reinforcing fibers which may be organic fibers (typically cellulose fibers) and/or synthetic fibers (polyvinylalcohol, polyacrilonitrile, polypropylene, polyamide, polyester, polycarbonate, etc.).

"Cement" present in the fiber cement products or fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

"Binder" or "mineral binder" or "hydraulic binder" as used herein may refer, without limitation, to cement, mixtures of cement and quartz sand, mixtures of cement and slaked lime $(Ca(OH)_2$ and optionally quartz or mixtures of slaked lime and quartz flour.

"Fiber cement product" as used herein generally refers to any object or product comprising fiber cement material.

"Fiber cement material" refers to a material essentially consisting of a fiber cement composition, which composition at least comprises fibers and cement.

The terms "inner core", "inner core layer", "core" or "core layer" as used interchangeably herein refer to the central innermost part or to the central innermost material of the fiber cement products of the present invention, which part or material has an average density between 0.4 and 0.9 g/cm$^3$ inclusive and is covered on at least 60% of its surface by a high-density outer surface fiber cement part or material (also referred to herein as "the shell").

The terms "outer fiber cement surface" or "outer fiber cement surface layer" as used interchangeably herein refer to the part(s) or material(s) covering the surface of the inner core (as defined herein) of the fiber cement products of the present invention for at least 60% and having an average density of between 0.9 and 1.4 g/cm$^3$ inclusive.

When generally referring to a "fiber cement layer" herein, it is intended to refer to any flat, optionally substantially rectangular, layer or cake essentially consisting of a fiber cement composition and having a thickness of at least about 0.2 mm, in particular between about 0.5 mm and 200 mm, more particularly between about 1 mm and about 150 mm, most particularly between about 2 mm and about 100 mm.

A "Hatschek fiber cement layer" or a "Hatschek layer" as interchangeably used herein refers to a fiber cement layer (as defined herein), which is produced according to a Hatschek process, which at least comprises the steps of:

(i) building a fiber cement film on a sieve, which rotates in contact with a fiber cement slurry in a vat;

(ii) transferring the fiber cement film from the sieve to a felt transport belt, and (iii) accumulating the fiber cement film on an accumulator roll via the felt transport belt.

A "non-Hatschek fiber cement layer" or a "non-Hatschek layer" as interchangeably used herein refers to a fiber cement layer (as defined herein), which is formed according to a fiber cement layer production process other than a conventional Hatschek process.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, ceiling board, flooring panel etc.

The term "lightweight material" as used herein refers to any material that, when used as an ingredient, component or constituent in a (building) product (formulation), adds a significant amount of volume without adding a significant amount of weight. Lightweight materials as referred to herein have a density of between about 0.01 to about 0.90 g/cm$^3$.

The term "filler(s)" as used herein refers to any material(s) interacting with binders in composites, such as cement, which improve particle packing and give the composite other properties. The use of fillers also allows to reduce the amount of cement to be used in cementitious products without resulting in loss of mechanical strength. "Lightweight filler(s)" as used herein refers to filler(s) made from or consisting of lightweight material.

The term "aggregate" as used herein refers to a broad category of coarse particulate material used in construction, including sand, gravel, crushed stone, slag, recycled concrete and geosynthetic aggregates. A category of aggregate materials can be used as specialty lightweight aggregates, such as but not limited to clay, pumice, (expanded) perlite, (expanded) vermiculite, expanded polystyrene, extruded polystyrene, foam, concrete foam, pumice, calcium silicate hydrate gel (CSH gel), microspheres, cenospheres (ceramic microspheres) and/or alkali resistant expanded glass spheres/beads, xonotlite and expanded shale.

"Density" as used in the context of the present invention refers to the average density of a fiber cementitious material or to the average density of a fiber cement product and represents the mass per unit volume (expressed in g/cm$^3$ herein) of the fiber cement material or fiber cement product. The density as referred to herein can be measured by any suitable standard test known in the art. For example, a sample of the fiber cement material or fiber cement product can be taken and the volume of the specimen can be determined by any method capable of giving a result accurate to within 2% of the results obtained by the water displacement method.

Water displacement test can be performed per Standard Test Methods C20, in which the volume (V) of the test specimen is obtained in cubic centimetres by subtracting the suspended weight (W) from the saturated weight (5), both in grams as follows:

$$V=W-S$$

where:
V=volume, cm³,
W=saturated weight, g, and
S=suspended weight, g.

This assumes that 1 cm³ of water weighs 1 g. This is true within about three parts in 1000 for water at room temperature. Suspended weight (S) is obtained for each test specimen by suspending the specimen in a loop or halter of AWG gage No. 22 (0.644 mm) copper wire hung from one arm of the balance. The balance shall be previously counter balanced with the wire in place and immersed in water to the same depth as is determining the suspended weight, blot each specimen lightly with a moistened smooth linen or cotton cloth to remove all drops of water from the surface, and determine the saturated weight (W) in grams by weighing in air to the nearest 0.1 g.

The density of the fiber cement specimen can then be calculated in g/cm³ using the equation:

$$\text{Density}=W/V \text{ in grams per cubic centimetre}(g/cm^3)$$

where:
W=dry mass of specimen, g, and
V=volume, cm³.

The term "water-permeable" as used herein when referring to a water-permeable (region of a) transport belt generally means that the material of which the water-permeable (region of the) belt is made allows water to flow through its structure to a certain extent.

The "water-permeability" as used herein when referring to the water-permeability of a (region of a) transport belt generally refers to the extent or degree to which the material of which the water-permeable (region of the) belt is made, allows water to flow through its structure. Suitable materials for water-permeable transport belts are known to the person skilled in the art, such as but not limited to felts.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

An object of the present invention is to provide lightweight fiber cement building materials having an improved workability while retaining a good mechanical performance and good water-resistant properties.

In this respect, the present inventors have achieved to develop fiber cement products comprising at least two different fiber cement materials, namely an inner core fiber cement material and an outer surface fiber cement material.

More specifically, the fiber cement products of the present invention comprise an inner core of low-density fiber cement material, which at least comprises cement and a lightweight filler. The inner core is covered (on at least 60% of its surface) by an (i.e. at least one) outer fiber cement shell, which at least comprises fibers and cement. The inner core material has a lower density than the at least one outer surface fiber cement material(s). In this way, the low-weight inner core provides the fiber cement product with (a lower weight and thus) an improved workability, while the outer surface ensures that the end product retains the same or similar mechanical strength and the same or similar water resistance properties compared to a fiber cement product, which would completely and exclusively consist of such outer surface fiber cement material(s).

In particular embodiments, the present invention provides fiber cement products, where the inner core fiber cement material is completely (i.e. all over its surface) covered by an outer fiber cement surface material or surface layer(s).

In certain other embodiments, the invention provides fiber cement products, where the inner core cement material is partially covered by an (i.e. at least one) outer fiber cement surface material or surface layer. In such embodiments, about 60% to about 100%, such as about 95%, of the surface of the inner core material is covered by an outer fiber cement surface material or surface layer(s). In further embodiments, the invention provides fiber cement products, where the inner core cement material is essentially completely covered by an outer fiber cement surface material or surface layer(s), i.e. in these embodiments, about 80% to about 100%, such as about 95%, of the surface of the inner core material is covered by an outer fiber cement surface material or surface layer(s).

In particular embodiments, the fiber cement products of the present invention comprise a low density inner core, having a density of between 0.4 g/cm³ and 0.9 g/cm³ inclusive, which is covered partially or (essentially) completely by two or more different outer surface materials, which outer surface materials have a density of between 0.9 g/cm³ and 1.4 g/cm³ inclusive.

For example, in particular embodiments, the inner core may be covered by a first outer surface fiber cement material layer, which first outer surface layer is covered in its turn by a second outer surface layer, which is different from the first outer surface layer. In further particular embodiments, the inner core may also be covered by three or more consecutive outer fiber cement surface materials or layers, each of which are different from each other.

In certain other particular embodiments, the inner core may be covered on (certain) part(s) of its surface by a first outer surface fiber cement material layer and on other different (certain) part(s) of its surface by a second outer surface layer, wherein the first outer fiber cement surface layer and the second outer fiber cement surface layer are different from each other. In further particular embodiments, the inner core may also be covered by three or more consecutive outer fiber cement surface materials or layers, each of which are different materials from each other and each of which outer surface layers cover different (certain) parts of the inner core of the fiber cement product.

In yet further particular embodiments, the inner core may be covered by two or more outer fiber cement surface materials or layers, each of which surface materials are different from each other and/or each of which outer surface materials or layers overlaps each other on at least (certain) parts of the inner core of the fiber cement product.

The fiber cement products of the present invention have an inner cementitious core with a low density of between about 0.4 g/cm³ and about 0.9 g/cm³ inclusive and at least one outer fiber cement surface, having a density between 0.9 g/cm³ and 1.4 g/cm³ inclusive. In particular embodiments, the inner cement core has a low density of between about 0.5 g/cm$^3$ and about 0.8 g/cm$^3$, such as of about 0.6 g/cm$^3$ or of about 0.7 g/cm$^3$ and the at least one outer fiber cement surface has a density of between 0.95 g/cm$^3$ and 1.3 g/cm$^3$, such as of about 1.0, 1.05, 1.1, 1.15, 1.20 or 1.25 g/cm$^3$. In further particular embodiments, the inner core has a density of about 0.6 g/cm$^3$ and the at least one outer fiber cement surface has a density of about 1.2 g/cm$^3$.

In particular embodiments, the fiber cement products according to the present invention are flat (or at least substantially flat) multi-layered fiber cement products, such as flat multi-layered boards, sheets, panels, sidings, planks, or plates. In such embodiments, the multi-layered fiber cement products of the present invention comprise at least one layer of an inner core fiber cement material, which is covered on at least both of its largest opposite surfaces by at least one outer fiber cement surface layer, characterized in that:

the inner core layer at least comprises cement and a lightweight filler and has a density of between about 0.4 g/cm$^3$ and about 0.9 g/cm$^3$ inclusive, and the at least one outer surface layer at least comprises fibers and cement and has a density of between about 0.9 g/cm$^3$ and about 1.4 g/cm$^3$ inclusive.

In further particular embodiments, the multi-layered fiber cement products of the present invention comprise at least one layer of an inner core fiber cement material, which is covered on at least both of its largest opposite surfaces by at least one outer fiber cement surface layer, characterized in that:

the inner core layer at least comprises cement and a lightweight filler and has a density of between about 0.4 g/cm$^3$ and about 0.9 g/cm$^3$ inclusive, and the at least one outer surface layer at least comprises fibers and cement and has a density of between about 1.0 g/cm$^3$ and about 1.4 g/cm$^3$ inclusive.

In further particular embodiments, the fiber cement products according to the present invention are flat three-layered fiber cement products, such as flat three-layered boards, sheets, panels, sidings, planks, or plates. In these particular embodiments, the present invention provides flat three-layered fiber cement products, characterized by the presence of an inner core cementitious layer having a density between about 0.4 g/cm$^3$ and about 0.9 g/cm$^3$ inclusive, which inner core is covered on each of its two largest opposite surfaces (i.e. its largest lower surface and its largest upper surface) by one outer fiber cement surface layer(s) having a density between about 0.9 g/cm$^3$ and about 1.4 g/cm$^3$ inclusive.

In further particular embodiments, one of the two largest flat surfaces of the inner core layer is covered (either completely, essentially completely, or partially) by an outer fiber cement surface layer and the other of the two largest flat surfaces of the inner core layer is covered (either completely, essentially completely, or partially) by an outer fiber cement surface layer, wherein the outer fiber cement surface layers are located at opposite sides of the inner core layer and may be different or may be the same.

In yet further particular embodiments, the present invention provides flat multi-layered fiber cement products, characterized by the presence of an inner core cement layer having a density between about 0.4 g/cm$^3$ and about 0.9 g/cm$^3$ inclusive, which inner core is covered on both of its largest opposite surfaces by two or more consecutive (i.e. overlapping) outer fiber cement surface layers, each of the outer fiber cement surface layers having a density between about 0.9 g/cm$^3$ and about 1.4 g/cm$^3$ inclusive.

In certain embodiments, the flat multi-layered fiber cement products of the present invention may be characterized by the presence of an inner core cement layer having a density between about 0.4 g/cm$^3$ and about 0.9 g/cm$^3$ inclusive, which inner core is covered by a different number of outer fiber cement surface layers on each side of its two opposite largest surfaces, each of the outer fiber cement surface layers having a density between about 1.0 g/cm$^3$ and about 1.4 g/cm$^3$ inclusive. For example, but without being limited thereto, one of the two largest flat surfaces of the inner core layer may be covered (either completely, essentially completely, or partially but at least for 60%) by one or more outer fiber cement surface layers whereas the other of the two largest flat surfaces of the inner core layer may be covered (either completely, essentially completely, or partially but at least for 60%) by two or more outer fiber cement surface layers. In alternative embodiments, the number of outer fiber cement surface layers on each of the two opposite largest surfaces of the inner core cement layer is the same, such as for example (but not limited to) fiber cement products having one outer surface fiber cement layer on each side of the inner core, or two overlapping outer surface fiber cement layers on each opposite largest surface side of the inner core, or three or more overlapping outer surface fiber cement layers on each opposite largest surface side of the inner core.

In particular embodiments, the outer fiber cement surface layers present in the flat multi-layered or three-layered fiber cement products of the invention may have a different composition or may have the same composition, as long as these fiber cement surface layers comprise at least fibers and cement and have a density of between 0.9 g/cm$^3$ and 1.4 g/cm$^3$ inclusive.

In particular embodiments, the inner core cement layer present in the flat multi-layered or three-layered fiber cement products of the invention has a thickness of between 1 mm and 100 mm, such as between 2 mm and 80 mm, such as between 3 mm and 60 mm, more particularly between 3 mm and 50 mm, most particularly a thickness of about 8 mm, of about 12 mm, of about 16 mm, of about 18 mm, or of about 40 mm.

In particular embodiments, the outer fiber cement surface layers present in the flat multi-layered or three-layered fiber cement products of the invention have a thickness of between 0.2 mm and 10 mm, such as between 0.5 mm and 5 mm, such as between 0.7 mm and 3 mm, more particularly between 0.8 mm and 2 mm, most particularly a thickness of about 1 mm. In particular embodiments, the outer fiber cement surface layers present in the flat multi-layered or three-layered fiber cement products of the invention may have thicknesses which are the same or which are different.

In particular embodiments, the fiber cement products according to the present invention are flat (or at least substantially flat) multi-layered fiber cement products, such as flat multi-layered boards, sheets, panels, sidings, planks, or plates, having a thickness of between 1.4 mm and 60 mm, such as between 2 mm and 50 mm, such as between 5 mm and 40 mm, such as between 7 mm and 20 mm, more particularly between 9 mm and 13 mm, most particularly a thickness of about 10 mm or about 11 mm. The lengths and widths of the fiber cement products of the present invention are not critical to the invention and may in principle be any suitable lengths and widths, which are appropriate for a given application or use of these particular fiber cement products in the building industry.

In particular embodiments, the fiber cement products according to the present invention are characterized in that the inner core material comprises between about 15% and about 95% of the total volume of said fiber cement product. In further particular embodiments, the fiber cement products according to the present invention are characterized in that between about 50% and about 90% of their total volume is made of inner core material having a density of between about 0.4 g/cm³ and 0.9 g/cm³. In yet further particular embodiments, the inner core of a fiber cement product(s) of the present invention has a volume of between 70% and 85% of the total volume of the fiber cement product(s), such as most particularly about 82% of the total volume of the fiber cement product(s).

In particular embodiments, the fiber cement products according to the present invention are characterized in that the inner core material comprises a lightweight filler in an amount of between 5 wt % and 75 wt % with respect to the total dry weight of the inner core material. In particular embodiments, the fiber cement products according to the present invention are characterized in that the inner core comprises a lightweight filler in an amount of between 5 wt % and 70 wt % with respect to the total dry weight of the inner core, such as particularly between 10 wt % and 60 wt %, more particularly between 15 wt % and 50 wt %, most particularly between 20 wt % and 40 wt % of lightweight filler in respect of the total dry weight of the inner core material.

In particular embodiments, the fiber cement products according to the present invention are characterized in that the inner core material comprises a lightweight filler (as defined herein). This lightweight filler may be a lightweight aggregate (as defined herein), such as but not limited to a lightweight aggregate, a masonry-lightweight aggregate and/or a structural lightweight aggregate. In further particular embodiments, the inner core material comprises a lightweight aggregate. In yet further particular embodiments, the fiber cement products according to the present invention are characterized in that the inner core material comprises a lightweight filler, which is chosen from the group consisting of expanded perlite, expanded vermiculite, expanded polystyrene, extruded polystyrene, foam, concrete foam, calcium silicate hydrate gel (CSH gel), microspheres, cenospheres (ceramic microspheres) and (alkali resistant) expanded glass spheres/beads, xonotlite and expanded shale.

In still further particular embodiments, the fiber cement products according to the present invention are characterized in that the inner core material comprises a lightweight filler, which is expanded perlite, expanded vermiculite, expanded polystyrene, extruded polystyrene, foam, concrete foam, calcium silicate hydrate gel (CSH gel), microspheres, cenospheres (ceramic microspheres), alkali resistant expanded glass spheres/beads, xonotlite or expanded shale or any suitable combination thereof.

In particular embodiments, the fiber cement products according to the present invention are characterized in that the inner core material comprises a lightweight filler, which is expanded perlite. In further particular embodiments, the fiber cement products according to the present invention have an inner core comprising between about 5% and 40%, such as between about 20% and 40% (in respect of total dry weight of inner core) of expanded perlite as a lightweight filler.

In other particular embodiments, the fiber cement products according to the present invention are characterized in that the inner core material comprises a lightweight filler, which is expanded polystyrene. In further particular embodiments, the fiber cement products according to the present invention have an inner core comprising between about 5% and 30% (in respect of total dry weight of inner core) of expanded polystyrene as a lightweight filler.

In certain other embodiments, the fiber cement products according to the present invention are characterized in that the inner core material comprises a lightweight filler, which is extruded polystyrene. In further particular embodiments, the fiber cement products according to the present invention have an inner core comprising between about 1% and 30%, such as between about 1% and 20% (in respect of total dry weight of inner core) of extruded polystyrene as a lightweight filler.

In particular embodiments, the fiber cement products according to the present invention are characterized in that the inner core material further comprises fibers.

In further particular embodiments, the fiber cement products according to the present invention are characterized in that the inner core material comprises fibers in an amount of between 0 wt % and 5 wt % with respect to the total dry weight of the inner core material. In yet further particular embodiments, the fiber cement products according to the present invention are characterized in that the inner core material comprises fibers in an amount of between 1 wt % and 4 wt % with respect to the total dry weight of the inner core material, such as about 2 wt %, about 3 wt % or about 4 wt % of fibers with respect to the total dry weight of the inner core material.

In particular embodiments, the fiber cement products according to the present invention are characterized in that the inner core material comprises cellulose fibers in an amount of between 0 wt % and 5 wt % with respect to the total dry weight of the inner core material. In further particular embodiments, the fiber cement products according to the present invention are characterized in that the inner core material comprises cellulose fibers in an amount of between 1 wt % and 4 wt % with respect to the total dry weight of the inner core material, such as about 2 wt %, about 3 wt % or about 4 wt % of cellulose fibers with respect to the total dry weight of the inner core material.

In certain particular preferred embodiments, the fiber cement products according to the present invention are characterized in that the inner core material comprises 0% cellulose fibers and comprises at least 1% of synthetic fibers, having a length of between 2 and 12 mm and a thickness of between 0.1 dtex and 15 dtex, preferably between 0.5 dtex and 5 dtex, most preferably of about 2 dtex.

The inner core layer further comprises cement, which can be any suitable cement type (as defined herein).

In particular embodiments, the fiber cement products according to the present invention are characterized in that each of the outer fiber cement surface layers comprises fibers in an amount of between 6 wt % and 10 wt % with respect to the total dry weight of each of these surface layers. In further particular embodiments, the fiber cement products according to the present invention are characterized in that each of the outer fiber cement surface layers comprises fibers in an amount of between 7 wt % and 9 wt % with respect to the total dry weight of each of these surface layers, such as about 7 wt %, about 8 wt % or about 9 wt % of fibers with respect to the total dry weight of the inner core material.

In particular embodiments, the fiber cement products according to the present invention are characterized in that each of the outer fiber cement surface layers comprises cellulose fibers in an amount of between 6 wt % and 10 wt % with respect to the total dry weight of each of these surface layers. In further particular embodiments, the fiber cement products according to the present invention are characterized in that each of the outer fiber cement surface layers comprises cellulose fibers in an amount of between 7 wt % and 9 wt % with respect to the total dry weight of each of these surface layers, such as about 7 wt %, about 8 wt % or about 9 wt % of cellulose fibers with respect to the total dry weight of the inner core material.

The outer surface layer further at least comprises (i.e. apart from fibers) cement, which can be any suitable cement type (as defined herein).

The fiber cement products or sheets as referred to herein include roof, wall, ceiling or floor covering products made out of fiber cement, such as fiber cement sidings, fiber cement boards, flat fiber cement sheets, corrugated fiber cement sheets and the like. According to particular embodiments, the fiber cement products according to the invention can be roofing or façade elements, flat sheets or corrugated sheets.

According to further particular embodiments, the fiber cement products of the present invention are fiber cement sheets.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, amorphous silica, ground quartz, the ground rock, clays, pigments, kaolin, metakaolin, blast furnace slag, carbonates, puzzolanas, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art. In particular embodiments, the total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 weight % and about 1 weight % compared to the total initial dry weight of the composition.

In a second aspect, the present invention provides methods for the production of fiber cement products as defined herein, at least comprising the steps of:
i) Providing a first cementitious material at least comprising cement and a lightweight filler and having a density of between about 0.4 g/cm$^3$ and about 0.9 g/cm$^3$ inclusive,
ii) Providing a second fiber cement material at least comprising fibers and cement and having a density of between about 0.9 g/cm$^3$ and about 1.4 g/cm$^3$ inclusive, and
iii) Assembling the first cementitious material and the second fiber cement material so as to obtain a fiber cement product comprising an inner core made of the first cementitious material, which inner core is covered by at least one outer surface layer made of the second fiber cement material.

In particular embodiments, the present invention provides methods for the production of a three-layered or multi-layered fiber cement products as described herein, the methods at least comprising the steps of:
i) Providing at least one fiber cement layer made of a first cementitious material, which at least comprises cement and a lightweight filler and has a density of between about 0.4 g/cm$^3$ and about 0.9 g/cm$^3$ inclusive,
ii) Providing at least two fiber cement layers made of a second fiber cement material, which at least comprises fibers, cement and a lightweight filler and has a density of between about 0.9 g/cm$^3$ and about 1.4 g/cm$^3$ inclusive, and
iii) Assembling the fiber cement layer of step (i) made of the first material and the at least two fiber cement layers of step (ii) made of the second material, so as to obtain a three-layered or multi-layered fiber cement sheet comprising an inner core layer made of the first cementitious material, which inner core layer is covered on at least two of its largest opposite surfaces by an outer surface layer made of the second fiber cement material.

In certain of these embodiments, a fiber cement sandwich panel is produced by the methods of the invention, which sandwich panel comprises an inner core layer of a low-density cementitious material (density of between 0.4 g/cm$^3$ and 0.9 g/cm$^3$) and two outer surface layers of a medium to high-density fiber cement material (density of between 0.9 g/cm$^3$ and 1.4 g/cm$^3$), each of which outer surface layers is positioned on the upper and lower largest surface, respectively, of the inner core layer.

Steps (i) and (ii) of the methods of the invention can be performed, either simultaneously or consecutively in any desired order. In these steps (i) and (ii), preparing a first cementitious material comprising at least cement and a lightweight filler and preparing a second fiber cement material comprising at least cement and fibers, can be done by any standard method known in the art.

For instance, first, a (fiber) cement slurry can be prepared by one or more sources of at least cement, water and optionally fibers. In certain specific embodiments, these one or more sources of at least cement, water and optionally fibers are operatively connected to a continuous mixing device constructed so as to form a cementitious fiber cement slurry.

In step (i), when using fibers, such as cellulose fibers or the equivalent of waste paper fibers, between about 0.1% and about 5% of the total slurry mass of these cellulose fibers is used. In addition, in step (i) between about 1% and 70%, more particularly between 1% and 40%, of a lightweight filler (as defined and described herein) is added to the fiber cement slurry so as to obtain a cementitious material having a density of between about 0.4 g/cm$^3$ and 0.9 g/cm$^3$.

In step (ii), between about 5% and about 10% of the total slurry mass of these cellulose fibers is used, such as more particularly, between about 6% and about 10%.

The fineness of the fibers (measured in Shopper-Riegler degrees) is in principle not critical to the processes of the invention.

Once the at least two types of fiber cement slurries are obtained, the preparation of the first cementitious material of steps (i) and the second fiber cement material of step (ii) can be executed according to any known procedure.

The process most widely used for manufacturing fiber cement materials is the Hatschek process, which is performed using a modified sieve cylinder paper making machine. Other manufacturing processes include the Magnani process, injection, extrusion, flow-on and others.

In particular embodiments, the fiber cement materials of the present invention are provided by using a combination of any of the known fiber cement product manufacturing processes, without limitation chosen from the group consisting of a Hatschek process, a Magnani process, an injection technology, an extrusion process and a flow-on process.

In further particular embodiments, the fiber cement materials of the present invention are provided by using a combination of a Hatschek process and a flow-on process. In these particular embodiments, steps (i) and/or (ii) of the methods according to the present invention each at least comprise the preparation of a fiber cement slurry followed by the formation of one or more uncured fiber cement layers (as defined herein) according to a Hatschek process and/or the formation of one or more uncured fiber cement layers (as defined herein) according to a flow-on process.

In yet further particular embodiments, steps (i) and (ii) of the methods of the present invention comprise forming one or more uncured fiber cement layers of a first cementitious material and forming one or more uncured fiber cement layers of a second fiber cement material, wherein the first cement material comprises at least cement and a lightweight filler and has a density between 0.4 $g/cm^3$ and 0.9 $g/cm^3$ the second fiber cement materials comprises at least fibers and cement and has a density between 1.0 $g/cm^3$ and 1.4 $g/cm^3$.

In this respect, forming one or more uncured fiber cement layers according to a Hatschek process at least comprises the steps of one complete cycle of a conventional Hatschek process as known in the art, i.e. (i) initial formation of a filter layer on the surface of a sieve; (ii) building of a very watery layer of fiber cement over the filter layer as the sieve rotates in contact with fiber cement slurry in a vat; (iii) low intensity dewatering of the wet film as it is transferred to a felt and (iv) high intensity dewatering of the film as it is passed through the nip of an accumulator roll.

The step of forming one or more uncured Hatschek fiber cement layers according to the invention is performed by means of a Hatschek machinery section, which is part of the apparatus according to the present invention (as further described herein).

Hatschek processes are generally known in the art and performed using a Hatschek machinery. As is known by the person skilled in the art, the fundamental part of a Hatschek machinery consists of one or more vats, in each of which vats a cylindrical sieve rotates in contact with a dilute water based fiber cement slurry. On the surface of each of the sieves, a filtering film and mineral materials including cement is formed. The sieve cylinder is mounted on an axle and driven by a an endless felt belt wrapped around the top of the sieve by a couch roller. The felt is threaded around a drive or anvil roller and a tail roller. The drive or anvil roller is pushed into hard contact with an accumulation roller. The actual Hatschek layers are formed as follows. As the clean sieve is pulled under the slurry in the vat, water from the slurry runs through the sieve depositing a soft porous film of fibers and cement on the surface of the sieve. The sieve carrying the film exiting the vat is brought into contact with the felt belt, which is stretched tightly across the sieve. This removes much of the water from the film by forcing it back through the film. The solid film floats on this layer of water and is transferred to the transport belt partly in response to the effect of removal of water and partly because the felt has a greater affinity for the film than the sieve. The film is carried on the transport belt to an accumulator roll to which it is transferred by further removal of water at high pressure. A sufficient number of films are wrapped on the accumulator roll to form a layer of the desired thickness. The stack of films is then removed from the roller and laid out flat to form the Hatschek layer. The action of dewatering successive films in contact with each other under pressure is sufficient to bind the films together to form a contiguous solid layer. In particular embodiments, the one or more uncured fiber cement layers according to a Hatschek process can be formed directly on the felt transport belt and further on the accumulator roll of a Hatschek machine. In alternative embodiments, the one or more uncured fiber cement layers according to a Hatschek process can be formed on the surface of one or more preformed but uncured fiber cement layers, which were produced by a flow-on process using the felt transport belt or the accumulator roll of a Hatschek machine as a forming surface.

Furthermore, forming one or more uncured fiber cement layers according to a flow-on process at least comprises the step of discharging a (fiber) cement slurry composition, either directly or indirectly (as further specified herein), on a forming surface.

The forming surface can in principle be any surface that is substantially flat, corrugated or otherwise shaped but should at least be suitable to retain a liquid layer of fiber cement slurry in place. The material of the forming surface should be alkali-resistant (i.e. resistant to a pH up to about 13). In particular embodiments, the forming surface is water-permeable. In further particular embodiments, the forming surface is a felt transport belt, such as a felt transport belt of a Hatschek machine. In yet further particular embodiments, the forming surface is an accumulator roll, such as an accumulator roll of a Hatschek machine.

In certain particular embodiments, the one or more uncured fiber cement layers, which are produced according to a flow-on process, are made by discharging a (fiber) cement slurry composition either directly onto a felt transport belt of a Hatschek machine or onto one or more previously formed Hatschek layers formed onto a felt transport belt of a Hatschek machine.

In certain particular embodiments, the one or more uncured (fiber) cement layers, which are produced according to a flow-on process, are made by discharging a (fiber) cement slurry composition either directly onto an accumulator roll of a Hatschek machine or onto one or more previously formed Hatschek layers formed onto an accumulator roll of a Hatschek machine.

In certain particular non-limiting embodiments, forming one or more uncured (fiber) cement layers by a flow-on process comprises discharging a flow of (fiber) cement slurry onto a forming surface using one or more flow-on distribution devices. In these particular embodiments, the (fiber) cement slurry distribution process at least comprises one or more flow-on distribution steps. Suitable flow-on distribution devices for the present invention at least comprise one or more flow-on dispensing systems with at least one outlet, thereby allowing the slurry to flow continuously onto the transport belt. In particular embodiments, the one or more outlets of the device are circularly or rectangularly shaped. In certain particular embodiments, the flow-on distribution devices further comprise one or more inlets, which are directly or indirectly operatively connected with a source of (fiber) cement slurry. Sources of (fiber) cement slurry can for example be but are not limited to one or more continuous (fiber) cement feeding systems or one or more continuous mixing devices constructed so as to form a cementitious (fiber) cement slurry and means for indirectly or directly feeding the slurry to one or more distribution devices.

In yet further particular embodiments, the length of the one or more flow-on dispensing systems for the continuous discharge of the cementitious slurry is at least 2.5 times the total width of the one or more inlets, such as at least 3.0 times, more particularly at least 3.5 times, such as at least 4.0 times, for instance at least 4.5 times or even at least 5.0 times the total width of the one or more inlets.

In certain particular embodiments, the one or more flow-on dispensing systems comprise at least one part with continuously moving sidewalls. In further particular embodiments, the one or more dispensing systems are internally partitioned by internal walls, either in only certain parts of the internal space of the system or throughout the entire internal space of the system.

In certain particular embodiments, the step of continuously discharging the (fiber) cement slurry on the belt can be performed through at least one device which continuously and randomly spatters or sprays (droplets of) (fiber) cement slurry onto the transport belt. In these particular embodiments, the (fiber) cement slurry distribution process at least comprises one or more spattering and/or spraying distribution steps, such as at least one spattering and at least one spraying distribution step.

In these particular embodiments, the step of continuously discharging the (fiber) cement slurry on the belt can be performed through one or more spattering devices, such as for instance but not limited to one or more agitated brush systems, which continuously and randomly spatter (droplets of) (fiber) cement slurry onto the forming surface.

According to these particular embodiments, the one or more agitated brush-like devices, such as bristle-brush-like devices, are partly or entirely in contact with the (fiber) cement slurry, which is provided by one or more sources of (fiber) cement slurry. In this way, droplets of (fiber) cement slurry stick to and are picked up by the bristles of the one or more brush-like devices. Through agitation of the one or more brush-like devices, the droplets of (fiber) cement slurry are discharged from the different bristles of the one or more brush-like devices onto the forming surface. Thus, according to these particular embodiments, a plurality of bristles are used in a brush-like configuration, which is agitated (e.g. rotated, vibrated, etc.) so as to flick small droplets of the (fiber) cement slurry from the supply source onto the forming surface. Such dispensing devices may be in a brush form (such as a bristle-brush form) in roll or cylindrical configuration, or in a brush form (such as a bristle-brush form) in an upstanding array which, when agitated, flicks the pellets or droplets of (fiber) cement slurry from the edge of the bristles onto the forming surface.

In still further particular embodiments, the step of continuously discharging the (fiber) cement slurry onto the forming surface can be performed through one or more spraying systems, which continuously and randomly spray (droplets of) (fiber) cement slurry, provided by one or more sources of (fiber) cement slurry onto the forming surface. In these particular embodiments, the (fiber) cement slurry distribution process at least comprises one or more spraying distribution steps. Characteristics of spraying devices suitable for use in the present invention are not critical to the present invention as long as such devices are configured to discharge (fiber) cement slurry droplets from an atomizer or other device (part) onto the forming surface. The spraying devices for use in the present invention are known to the person skilled in the art and can be developed using routine techniques.

In yet further particular embodiments, the step of continuously discharging the (fiber) cement slurry onto the forming surface can be performed through any suitable combination of the one or more dispensing systems as described herein.

Thus, in particular embodiments, the step of continuously discharging the (fiber) cement slurry onto the belt can be performed consecutively by one or more flow-on distribution devices, continuously producing a (fiber) cement slurry flow, and/or one or more spattering distribution devices, which continuously and randomly spatter (droplets of) (fiber) cement slurry and/or one or more spraying distribution devices, which continuously and randomly spray (droplets of) (fiber) cement slurry onto the forming surface.

As a non-limiting example of these embodiments, the step of continuously discharging the (fiber) cement slurry on the belt can be performed consecutively by one or more flow-on distribution devices, which continuously and randomly produce a flow of cement slurry onto the forming surface, and/or one or more brush-like distribution systems and/or one or more spraying systems, which continuously and randomly spatter and/or spray, respectively, (droplets of) (fiber) cement slurry onto the forming surface.

In certain particular embodiments, the step of continuously discharging the (fiber) cement slurry on the belt can be performed consecutively by producing a flow of cement slurry onto the forming surface by means of one or more flow-on distribution devices, followed continuously and randomly spattering (droplets of) (fiber) cement slurry onto the forming surface by means of one or more brush-like dispensing systems. It will be understood that in these specific embodiments, the step of discharging (fiber) cement slurry can also be performed by first continuously and randomly spattering (droplets of) (fiber) cement slurry onto the forming surface using one or more brush-like dispensing systems, and then continuously and randomly producing a flow of cement slurry onto the forming surface by using one or more flow-on distribution devices.

In certain other particular embodiments, the step of continuously discharging the (fiber) cement slurry on the belt can be performed consecutively by continuously and randomly producing a flow of cement slurry onto the forming surface by means of one or more flow-on distribution devices, followed continuously and randomly spraying (droplets of) (fiber) cement slurry onto the forming surface by means of one or more spraying distribution systems. It will be understood that in these specific embodiments, the step of discharging (fiber) cement slurry can also be performed by first continuously and randomly spraying (droplets of) (fiber) cement slurry onto the forming surface using one or more spraying distribution systems, and then continuously and randomly producing a flow of cement slurry onto the forming surface by using one or more flow-on distribution devices.

In further particular embodiments, the step of continuously discharging the (fiber) cement slurry onto the forming surface can be performed consecutively by continuously and randomly producing a flow of cement slurry onto the transport belt by means of one or more flow-on distribution devices, followed by continuously and randomly spattering (droplets of) (fiber) cement slurry onto the forming surface by means of one or more brush-like distribution systems, further followed by continuously and randomly spraying (droplets of) (fiber) cement slurry onto the forming surface by means of one or more spraying distribution systems.

It will be understood that in these specific embodiments, the step of discharging (fiber) cement slurry can also be performed by consecutively producing a flow of cement slurry onto the forming surface by means of one or more flow-on distribution devices, followed by continuously and randomly spraying (droplets of) (fiber) cement slurry onto the forming surface by means of one or more spraying systems, further followed by continuously and randomly spattering (droplets of) (fiber) cement slurry onto the forming surface by means of one or more brush-like distribution systems.

Alternatively, in these specific embodiments, the step of discharging (fiber) cement slurry can also be performed by first continuously and randomly spraying (droplets of) (fiber) cement slurry onto the forming surface using one or more spraying systems, and then continuously and randomly either (i) first producing a flow of cement slurry onto the forming surface by using one or more flow-on distribution devices and then continuously and randomly spattering (droplets of) (fiber) cement slurry onto the forming surface using one or more brush-like distribution systems or (ii) first continuously and randomly spattering (droplets of) (fiber) cement slurry onto the forming surface using one or more brush-like distribution systems and then producing a flow of cement slurry onto the forming surface by using one or more flow-on distribution devices.

Yet in an alternative scenario according to these specific embodiments, the step of discharging (fiber) cement slurry can also be performed by first continuously and randomly spattering (droplets of) (fiber) cement slurry onto the forming surface using one or more brush-like dispensing systems, and then continuously and randomly either (i) first producing a flow of cement slurry onto the forming surface by using one or more flow-on distribution devices and then continuously and randomly spraying (droplets of) (fiber) cement slurry onto the forming surface using one or more spraying systems or (ii) first continuously and randomly spraying (droplets of) (fiber) cement slurry onto the forming surface using one or more spraying systems and then producing a flow of cement slurry onto the forming surface by using one or more flow-on distribution devices.

In the processes of the present invention, in order to obtain a (fiber) cement sheet with predetermined dimensions (i.e. thickness, length) and densities, the amount of cementitious slurry that is discharged onto the forming surface per time unit is controlled but will depend on different parameters, such as the type and predetermined dimensions of the final product to be made and the specific composition of the (fiber) cement slurry. It will be clear that the amount of cementitious slurry that is to be discharged onto the forming surface per time unit in order to obtain a certain (fiber) cement product can be determined by the skilled person using routine techniques.

In particular embodiments, the obtained one or more uncured (fiber) cement layers can optionally be treated in various ways. For instance, the (fiber) cement layers can be pressed by mechanical means, such as by a (cylindrical) belt press.

Alternatively, or additionally the obtained one or more uncured (fiber) cement layers can be treated with various agents so as to improve or alter their structure or properties. For example, the layers can be treated with a hydrophobic agent.

The processes according to the present invention further comprise the step (iii) of producing a fiber cement product by assembling the one or more uncured (fiber) cement layers (being Hatschek layers, non-Hatschek layers or a combination thereof), so as to obtain a fiber cement product comprising an inner core made of at least one layer of a first cementitious material, which inner core is covered on at least two of its largest opposite surfaces by at least one outer surface layer made of a second fiber cement material, wherein:
  i) the first cementitious material at least comprising cement and a lightweight filler and having a density of between about 0.4 g/cm$^3$ and about 0.9 g/cm$^3$ inclusive, and
  ii) the second fiber cement material at least comprising fibers and cement and having a density of between about 0.9 g/cm$^3$ and about 1.4 g/cm$^3$ inclusive.

Accordingly, step (iii) of the methods of the present invention comprises combining or assembling the first cement material and the second fiber cement material as obtained in steps (i) and (ii), respectively, in such a way so as to produce a fiber cement product comprising an inner core made of the first cement material, which inner core is covered (on at least 60% of its surface) by at least one outer surface layer made of the second fiber cement material.

Step (iii) of the processes of the present invention can be performed according to any manner known in the art.

In particular embodiments, the uncured fiber cement layers, as obtained in steps (i) and (ii) of the methods of the invention, may be superimposed either simultaneously with their formation step or alternatively after their formation step.

In particular embodiments, an uncured Hatschek layer may be superimposed onto another layer during (i.e. simultaneously with) the Hatschek formation step in the processes of the present invention. Typically, a Hatschek layer is formed by producing a series of fiber cement films (primary layers or monolayers) and subsequently juxtaposing these on an accumulator roll. Thus, in these particular embodiments, superimposing the Hatschek layer onto another layer may be done during the accumulation step of the Hatschek formation process, whereby the Hatschek layer being formed is wrapped around one or more previously formed uncured Hatschek or uncured non-Hatschek layers already wound onto the accumulator roll. Accordingly, in these particular embodiments of the processes of the present invention, step c) of superimposing in a predetermined order the one or more Hatschek fiber cement layers and the one or more non-Hatschek fiber cement layers, is performed on the accumulator roll.

In alternative embodiments, an uncured Hatschek layer may be superimposed onto another layer after the Hatschek formation step in the processes of the present invention. Typically, a Hatschek layer, after being formed on the accumulator roll, may be cut to a predetermined length. Thus, in these particular embodiments, superimposing the Hatschek layer onto another layer may be done after cutting the Hatschek layer and by subsequently transferring the Hatschek layer onto a previously formed (and optionally cut) uncured Hatschek or non-Hatschek layer or onto a stack of one or more previously formed (and optionally cut) uncured Hatschek and/or non-Hatschek layers.

In particular embodiments, an uncured non-Hatschek layer may be superimposed onto another layer during (i.e. simultaneously with) the fiber cement distribution step in the processes of the present invention. In the processes according to the invention, a non-Hatschek layer is formed by discharging a fiber cement slurry composition onto an endless transport belt by means of a flow-on, a spattering or a spraying mechanism as described herein. Thus, in these particular embodiments, superimposing the Hatschek layer may be done during this flow-on, spattering or spraying fiber cement distribution step, whereby the non-Hatschek layer being formed is directly discharged onto one or more previously formed uncured Hatschek or uncured non-Hatschek layers present on the transport belt.

In alternative and/or additional embodiments, an uncured non-Hatschek layer may be superimposed onto another layer during (i.e. simultaneously with) the fiber cement distribution step in the processes of the present invention. In the processes of the present invention, after forming a non-Hatschek layer, this layer may be wrapped or accumulated onto an accumulator roll (also referred to as a forming cylinder). Thus, in these particular embodiments, superimposing the non-Hatschek layer may be done by wrapping the already formed non-Hatschek layer around one or more previously formed uncured Hatschek or uncured non-Hatschek layers already wound onto the accumulator roll.

In alternative and/or additional embodiments, an uncured non-Hatschek layer may be superimposed onto another layer after the fiber cement distribution step in the processes of the present invention. In the processes of the present invention, a non-Hatschek layer, after being formed, may be cut to a predetermined length. Thus, in these particular embodiments, superimposing the non-Hatschek layer may be done after cutting the layer and by subsequently transferring the non-Hatschek layer onto a previously formed (and optionally cut) uncured Hatschek or non-Hatschek layer or onto a stack of one or more previously formed and (and optionally cut) uncured Hatschek and/or non-Hatschek layers.

In particular embodiments of the processes of the present invention, after formation, each of the one or more Hatschek layers and each of the one or more non-Hatschek layers can be superimposed by winding each of the formed but uncured layers onto a forming cylinder in a predetermined order.

Thus, in principle, using the processes of the invention, a fiber cement product comprising any combination of uncured Hatschek and non-Hatschek layers can be produced by superimposing (as described herein) the produced uncured Hatschek and non-Hatschek layers in an arbitrary, although predefined, sequence.

It should be understood that the fiber cement products produced according to the processes of the invention are not limited as to the number of Hatschek or non-Hatschek layers comprised therein. Accordingly, the total number of Hatschek layers and non-Hatschek layers comprised in the fiber cement products of the present invention is at least three. In particular embodiments, the fiber cement products of the present invention may comprise at least three, at least four, at least five, at least six, at least seven, at least eight, at least nine, such as at least ten superimposed layers, which may be made of the same or of a different material, and each of which may be a Hatschek layer or a non-Hatschek layer. In further particular embodiments, the fiber cement products of the present invention may comprise at least three superimposed layers, of which at least two layers are made of a different material, and each layer may be a Hatschek layer or a non-Hatschek layer. In yet further particular embodiments, the fiber cement products of the present invention may comprise at least four superimposed layers, of which at least two layers are made of a different material, and each of which layer may be a Hatschek layer or a non-Hatschek layer.

The one or more Hatschek layers and the one or more non-Hatschek layers produced according to the processes of the invention are superimposed as soon as possible, i.e. during or immediately after formation, thereby avoiding any setting to occur between the layers as well as preventing any additional transport steps to be undertaken. The process is therefore easy to implement, highly flexible, cost-effective and efficient.

In certain particular embodiments, the processes according to the invention are continuous processes, meaning that the formation of Hatschek layers, non-Hatschek layers and fiber cement products is performed in a continuous way, i.e. without any interruption in between any of the different steps of the process and/or in between one cycle of a fiber cement product formation and a following cycle of a (i.e. another) fiber cement product formation.

In certain other particular embodiments, the processes according to the invention are discontinuous processes, meaning that the formation of Hatschek layers, non-Hatschek layers and fiber cement products is performed in a discontinuous way, i.e. being characterized by one or more interruptions occurring in between any of the different steps of the process and/or in between one cycle of a fiber cement product formation and a following cycle of a (i.e. another) fiber cement product formation.

While any combination of Hatschek layers and non-Hatschek layers can be made in order to obtain a fiber cement product according to the present invention, in certain particular embodiments, the fiber cement products according to the present invention are made by an alternate superimposition of a Hatschek layer onto a non-Hatschek layer or vice versa until the desired number of layers is reached. In these embodiments, each Hatschek formation step starts when a fiber cement distribution step ends and vice versa.

For instance, the fiber cement distribution step may be started by discharging a fiber cement slurry on a dewatering conveyor belt either through one or more mechanisms of flow-on, spattering and/or spraying. In addition, the fiber cement distribution step may be stopped by interrupting the flow-on, spattering and/or spraying of fiber cement slurry onto the conveyor belt. The Hatschek formation step may for example be started by initiating the Hatschek machinery and bringing the Hatschek sieves into contact with fiber cement slurry. On the other hand, by way of example, the Hatschek step may be stopped by rinsing the rotating sieves of the Hatschek machine with water (instead of being in contact with a source fiber cement slurry), thereby avoiding the formation of a fiber cement film on each the sieves.

According to the invention, when the Hatschek formation step is stopped, i.e., for example when the water spray nozzles have started to rinse the sieves, the Hatschek build-up step is not immediately stopped since it is needed to wound the just formed series of fiber cement layers on the forming cylinder. The same applies for the fiber cement distribution step and build-up step. It is also clear from the aforementioned that the Hatschek formation step and the Hatschek build up step are separated steps operating concomitantly. The same applies for the fiber cement distribution formation and build-up steps.

The fiber cement products manufactured according to the processes of the present invention combine high strength (due to the presence of the medium- to high-density surface layers) and light weight, good thermal and acoustic insulating properties and enhanced workability (due to the presence of the low-density inner core layer(s)).

As previously set out, the process according to the invention allows any desired design of a fiber cement product, which design is represented by a specific combination of Hatschek and non-Hatschek layers of the same or of a different composition According to particular embodiments, the thickness of each Hatschek or non-Hatschek layer can be monitored by tuning the duration of each Hatschek formation step or fiber cement distribution step (i.e. working through flow-on, spattering or spraying).

It will be clear to the skilled person that, in particular embodiments, one or more of the same compositions of (fiber) cement slurry or one or more different compositions of (fiber) cement slurry, and optionally one or more compositions other than (fiber) cement slurry compositions, can be used in each of the one or more Hatschek formation steps as well as in each of the one or more non-Hatschek formation steps (i.e. the latter being interchangeably used with the terminology "fiber cement distribution step(s)").

In this manner, by making use of one or more consecutively installed Hatschek formation systems and one or more fiber cement slurry distribution systems as described herein, fiber cement products comprising at least three or multiple layers having a specific and predetermined composition, can be manufactured by the processes of the invention.

According to certain particular embodiments of the invention, the resulting fiber cement products, obtainable by the processes described herein, comprise three layers, i.e. a lower, middle and upper layer, i.e. two outer skin layers and one inner core layer. In these particular embodiments, it may be envisaged that the at least one non-Hatschek layer formed according to the fiber cement distribution step comprises lightweight fillers to form a lightweight core fiber cement layer. In addition, in these embodiments, two outer fiber cement skin layers having a higher density than the light weight core cement layer may be manufactured according to a Hatschek formation step and subsequently superimposed on each side of the core layer. In these particular embodiments, the Hatschek layers manufactured according to a Hatschek formation step, which layers represents one of the outer skin layers of the resulting product, preferably comprise substantially no lightweight fillers. On the other hand, the at least one non-Hatschek layer manufactured according to a fiber cement distribution step, which layer represents the inner core layer of the resulting product, preferably comprises a certain amount of lightweight fillers as described herein. These lightweight fillers are used to reduce the density of the at least one layer manufactured according to the fiber cement distribution step, and can, without limitation, be chosen from the group consisting of: expanded minerals such as perlite, vermiculite, microspheres, such as cenospheres (ceramic microspheres), alkali resistant expanded glass spheres/beads, polymeric microspheres or beads, expanded clay, xonotlite, expanded polystyrene hollow spheres etc. Preferred density modifiers are those with a closed porosity, such as microspheres, as they avoid water absorption of the cement sheet during manufacturing and consequently intensive drying. The amount of lightweight fillers is preferably in the range of from 1 to 70 wt %, such as between 1 and 40%, with respect to the total dry weight of the composition used for the manufacture of the core. The use of lightweight fillers reduces the density (and hence the weight) of the layer manufactured according to the fiber cement distribution step, which implies easier handling and improved insulating properties. Preferably, the diameter of the lightweight fillers is in the range of between about 2 μm and about 2000 μm.

Preferably, and in the present specific embodiments, the fiber cement product comprises a non-Hatschek core layer comprising no fibers, or at least less fibers than the one or more Hatschek outer skin layers on at least one of the faces of the core. The total amount of fibers in the core layer is preferably equal to or less than 15% by weight (wt %) with respect to the initial total weight in the dry state of the hydraulic-setting composition, and more preferably this content is equal to or less than 10% by weight (wt %) with respect to the initial total dry weight of the hydraulic-setting composition. The content of fibers in the core layer is most preferably between about 0 and 5% by weight (wt %) with respect to the initial total dry weight of the hydraulic-setting composition.

Typically, the fibers in a layer manufactured according to the fiber cement distribution step are three-dimensionally oriented, and consequently part of the fibers do no contribute to the strength of the fiber reinforced cement material.

In particular embodiments, the non-Hatschek layers and the Hatschek layers according to the present invention can, independently of each other, be composed of:
- a hydraulic binder, preferably present in a concentration of about 10 to about 80 wt % (with respect to the initial total weight in the dry state of the composition), more preferably about 20 to about 50 wt %, and most preferably about 25 wt % to about 40 wt %;
- auxiliary materials including but not limited to inert fillers, additives improving or achieving specific product performance, pozzolans, processing aids, . . . optionally present in a concentration of about 0 to about 80 wt %, more particularly less than about 50 wt %; and optionally
- fibers, optionally present in a concentration of about 1 wt % to about 30 wt %.

The orientation of the fibers in layers manufactured according to the Hatschek process of the Hatschek formation step is primarily parallel to the planar series of fiber cement monolayers of the sheet, and especially in the machine loading direction. This planar orientation imparts the strength of the fiber reinforced cement building material.

In particular embodiments, the processes of the invention at least use one or more endless transport belts or conveyor belts, onto which the different Hatschek and optionally the different non-Hatschek layers of fiber cement are produced.

In particular embodiments, only the one or more Hatschek layers are formed on a dewatering conveyor belt, while the one or more non-Hatschek layers are formed on a forming surface other than a conveyor belt, such as for instance but not limited to a plate, a corrugated plate, a water-permeable flat material, a membrane, a fleece, an accumulator roll etc.

In particular embodiments, the one or more Hatschek layers and the one or more non-Hatschek layers are formed on the same type but on different, i.e. separately installed, dewatering conveyor belts.

In other particular embodiments, the one or more Hatschek layers and the one or more non-Hatschek layers are formed on the same dewatering conveyor belt, thereby increasing compactness of the process machinery and reducing transport costs during production.

In the processes of the present invention, the (fiber) cement slurry is continuously discharged by one or more distribution systems (as described herein), either directly or indirectly, onto the water-permeable transport belt.

Thus, in particular embodiments of the present invention, the (fiber) cement slurry is discharged by one or more distribution systems directly onto the surface of a water-permeable transport belt.

In other particular embodiments, the (fiber) cement slurry is discharged by one or more distribution systems onto a water-permeable transport belt in an indirect manner.

In these specific embodiments, the (fiber) cement slurry may first be discharged by one or more distribution systems onto a surface other than a water-permeable transport belt, such as for example but not limited to a transport belt which is not water-permeable, and only then further transported, deposited, or placed onto a water-permeable transport belt.

In other specific embodiments, the (fiber) cement slurry may be discharged indirectly onto the transport belt, by discharging it directly onto the surface of an already formed uncured Hatschek layer or onto the surface of an already formed uncured non-Hatschek layer, which uncured layers in their turn were either formed directly onto the (water-permeable) transport belt or indirectly onto the transport belt, such as for instance onto another preformed Hatschek or non-Hatschek-layer, which were again in their turn formed directly or indirectly onto the belt, etc. In this way, it will be understood that the superimposition of these different Hatschek and/or non-Hatschek layers results in an (fiber) cement product, which is composed of these different uncured Hatschek and/or non-Hatschek layers.

The processes according to the present invention may further comprise the step of cutting the fiber cement product obtained in step (c) to a predetermined length. Cutting the fiber cement sheet to a predetermined length can be done by any technique known in the art, such as but not limited to water jet cutting, air jet cutting or the like. The fiber cement sheets can be cut to any desirable length, such as but not limited to a length of between about 1 m and about 15 m, such as between about 1 m and about 10 m, more particularly between about 1 m and about 5 m, most particularly between about 1 m and about 3 m.

It will be understood by the skilled person that the processes of the present invention may further comprise additional steps of processing the produced fiber cement products.

For instance, in certain particular embodiments, during the processes of the present invention, the fiber cement slurry and/or the fiber cement sheets can undergo various intermediate treatments, such as but not limited to treatment with one or more hydrophobic agents, treatment with one or more flocculants, additional or intermediate pressing steps, etc.

It will be clear to the person skilled in the art that such intermediate processing steps can be introduced in the processes of the invention at any stage, i.e. before, during and/or after any of the different steps of the processes of the invention.

As soon as the fiber cement sheet is formed, it may optionally be trimmed at the lateral edges. The border strips can optionally be recycled through immediate mixing with the recycled water and directing the mixture to the mixing system again.

In particular embodiments of the present invention, the processes of the present invention may further comprise the step of producing a corrugated fiber cement sheet from the obtained fiber cement sheet. In these embodiments, the step of producing the corrugated fiber cement sheet may comprise for example at least the step of transferring the obtained fiber cement sheet to a corrugated sheet mold to form a corrugated fiber cement sheet. However, other techniques to produce corrugated sheets from flat sheets are known to the skilled person and may as well be used in combination with the processes of the present invention in order to obtain corrugated fiber cement sheets.

In particular embodiments, the processes of the invention may further comprise the step of curing the obtained fiber cement sheets. Indeed, after production, fiber cement products can be allowed to cure over a time in the environment in which they are formed, or alternatively can be subjected to a thermal cure (e.g. by autoclaving or the like).

In further particular embodiments, the "green" fiber cement sheet is cured, typically by curing to the air (air cured fiber cement products) or under pressure in presence of steam and increased temperature (autoclave cured). For autoclave cured products, typically sand is added to the original fiber cement slurry. The autoclave curing in principle results in the presence of 11.3 Å (angstrom) Tobermorite in the fiber cement product.

In yet further particular embodiments, the "green" fiber cement sheet may be first pre-cured to the air, after which the pre-cured product is further air-cured until it has its final strength, or autoclave-cured using pressure and steam, to give the product its final properties.

According to the process of the present invention, the resulting fiber cement sheet leaves the forming cylinder in an uncured and green state. Thus, the Hatschek and non-Hatschek layers are subsequently co-cured, thereby producing a strong interfacial layer bonding, which avoids delaminations during handling, cutting, installation and service; the assembly of the layers manufactured in the process according to the invention does not require any adhesive. Advantageously, the resulting fiber cement sheet is autoclaved.

In particular embodiments of the present invention, the processes may further comprise the step of thermally drying the obtained fiber cement sheets. After curing, the fiber cement product being a panel, sheet or plate, may still comprise a significant weight of water, present as humidity. This may be up to about 10 weight % even 15 weight % (wt %), expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

According to a third aspect, the present invention provides uses of the fiber cement products and fiber cement sheets according to the present invention in the building industry. In particular embodiments, the fiber cement sheets of the present invention can be used to provide an outer surface to walls, both internal as well as external a building or construction, e.g. as façade plate, siding, etc.

The invention will now be further illustrated in detail with reference to the following Examples. It is to be understood that although preferred embodiments and/or materials have been discussed for providing embodiments according to the present invention, various modifications or changes may be made without departing from the scope and spirit of this invention.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Example 1: Production of Fiber Cement Sheets According to a Specific Embodiment of the Invention A fiber cement sheet consisting of two Hatschek skin layers (also referred to herein as "outer surface layers") each having a thickness of about 4 mm and one non-Hatschek core layer with a thickness of about 10 mm was manufactured according to the process of the invention.

The formulation of the core layer comprised about 5.5 wt % with respect to the total dry weight of the composition of perlite, while the skin layers are exempt of light weight fillers.

The sheet was autoclaved under steam pressure at 100.9 MPa during 17 hours.

The force at rupture (F expressed in N) was determined by a flexural test on three points using an apparatus, a span of 160 mm and a test speed of 30 mm/minute on air-dry samples of 300*300 mm. Three samples were measured in the machine direction, two weeks after production. The average of the force at breakage is given in Table 1 and is expressed in % with Comparative Example 1 as a reference.

Comparative Example 1

An autoclaved fiber reinforced cement Hatschek sheet with a thickness of about 20 mm having the same formulation as the outer Hatschek skin layers in Example 1 was tested on flexural resistance in the same way as described in Example 1.

TABLE 1

|  | F (%) | Weight (kg/m²) |
| --- | --- | --- |
| Example 1 | 98 | 20.1 |
| Comparative Example 1 | 100 | 25.8 |

Example 2: Production of Fiber Cement Sheets According to a Specific Embodiment of the Invention Three different structures of three-layered fiber cement sheets (samples D, E and F) were produced according to the methods of the invention. Each three-layered structure consisted of two fiber cement Hatschek skin (medium- to high-density) layers (also referred to herein as "outer surface layers") and one inner (low-density) non-Hatschek core layer (see Table 2). In addition, three different reference structures were prepared (samples A, B and C) exclusively consisting of the fiber cement material used to produce the medium- to high-density skin layers of the test structures. For each structure (A, B, C, D, E and F), multiple samples were tested and the obtained results represent an average of the results obtained for each of the samples.

Table 2 shows the composition of the skin layer material and the composition of the core layer material.

TABLE 2

|  | Core (inner core layer) | | Skin (outer surface layer) | |
| --- | --- | --- | --- | --- |
|  | Absolute weight of each of the dry matter components (kg) | Relative weight compared to total weight of dry matter components (weight %) | Absolute weight of each of the dry matter components (kg) | Relative weight compared to total weight of dry matter components (weight %) |
| Cellulose (Tasman) | 4.00 | 4.00 | 8.00 | 8.00 |
| Expanded perlite | 30.00 | 30.00 | — | — |

TABLE 2-continued

|  | Core (inner core layer) | | Skin (outer surface layer) | |
| --- | --- | --- | --- | --- |
|  | Absolute weight of each of the dry matter components (kg) | Relative weight compared to total weight of dry matter components (weight %) | Absolute weight of each of the dry matter components (kg) | Relative weight compared to total weight of dry matter components (weight %) |
| Cement | 26.40 | 26.40 | 36.80 | 36.80 |
| Quartz | 39.60 | 39.60 | 55.20 | 55.20 |
| TOTAL | 100.00 | 100.00 | 100.00 | 100.00 |

Table 3 shows the thicknesses and densities of each of the layers (one core layer and two skin layers) for the six structures.

TABLE 3

| Monolayer | Samples | A | B | C |
| --- | --- | --- | --- | --- |
| Density | [g/cm³] | 1.2 | 1.2 | 1.2 |
| Thickness (Total) | [mm] | 7.5 | 9 | 12.5 |
| Weight per unit surface | [kg/m²] | 9.00 | 10.80 | 15.00 |
| Force | [%] | 66 | 100 | 193 |
| Stiffness | [Nm]/1000 | 3.4 | 5.9 | 15.7 |
| Multilayer | Samples | D | E | F |
| Density | [g/cm³] | 0.8 | 0.87 | 0.9 |
| Thickness (Skin1-Core-Skin2) | [mm] | 1-9-1 | 2.6-6.3-1.9 | 2-7.5-2 |
| Thickness (Total) | [mm] | 11 | 10.8 | 11.5 |
| Weight per unit surface | [kg/m²] | 8.80 | 9.40 | 10.35 |
| Force | [%] | 92 | 101 | 125 |
| Stiffness | [Nm]/1000 | 6.3 | 6.5 | 8.1 |

The breaking force of the sheets ("Force" in % as compared to monolayer sample B) presented in Table 3 was determined and is presented in the graph of FIG. 1 in function of the weight in kg/m².

The stiffness (synonym for the "flexural rigidity") of the sheets was also determined and can be defined as the resistance of an object to deform in response to an applied force. The stiffness is related to the elastic modulus of the material and incorporates—in case of bending stiffness—the thickness of the board and can be calculated a follows:

$$\text{Flexural rigidity} = \text{Stiffness} = \text{elastic modulus}(E) \times \text{area moment of inertia}(I) \text{ of a board of 1m width.}$$

Flexural rigidity or stiffness of a board in bending is inversely proportional to the deformation of the board upon a given applied force. The moment of inertia, I, is proportional to the thickness$^3$.

From FIG. 1, it is clear that the force, which is needed to break the sheets in function of the weight is increased in the multi-layered structures versus the monolayered structure. This means that the relative mechanical strength (i.e. as a function of the density) of a multi-layered sheet of the present invention is increased compared to the relative mechanical strength of conventional monolayered fiber cement sheets.

Figure 2:
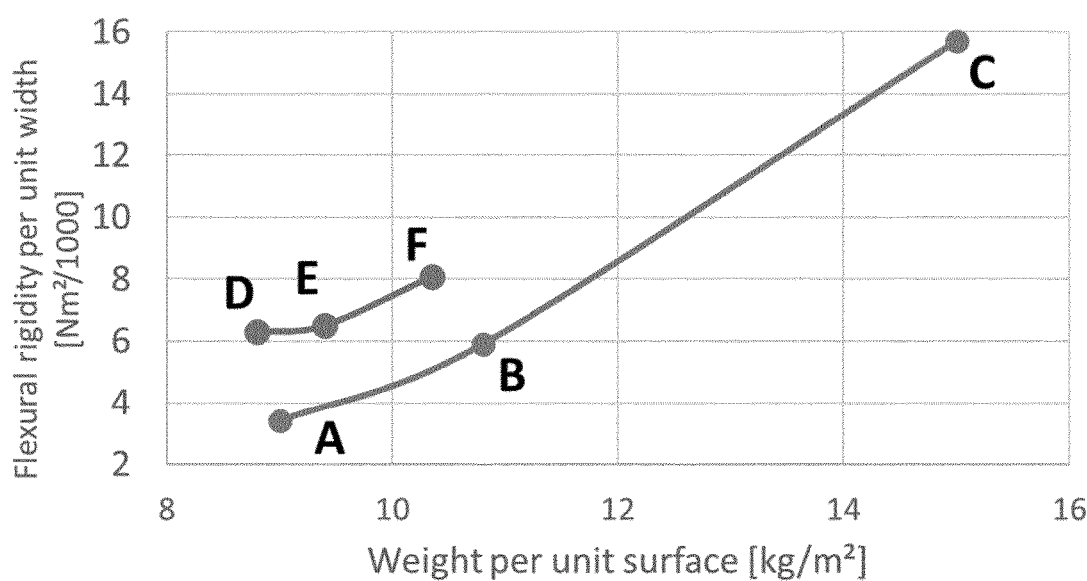
FIG. 2 shows the flexular rigidity (in [Nm$^2$]/1000) of multi-layered structures produced according to specific embodiments of the methods of the invention compared to conventional monolayered structure in function of the weight in kg/m$^2$.

Similarly, FIG. 2 shows that the flexural rigidity is increased in the multi-layered structures versus the monolayered structure. This means that the rigidity of a multi-layered sheet of the present invention is increased compared to the rigidity of conventional monolayered fiber cement sheets.

Example 3: Workability Tests of the Fiber Cement Sheets Produced According to the Specific Embodiment of Example 2

The three-layered samples D, E and F as produced in accordance with the description of Example 2, were further tested for their workability.

3.1 Jig Saw Test

In the jig saw test, the travelled length by jig saw (Metabo St EP 564; blade: Bosch T141HM; cutting speed position 4) was measured in 10 seconds under its own weight on an inclined slope of 30°.

The jig-saw tests were performed on three-layered samples H, and I (each consisting of two outer skin layers and one inner core layer), which samples have one inner core and two outer skin surface layers, with compositions as indicated in Table 2. Also, a mono-layer skin surface material sample G, completely consisting of the skin surface layer composition as indicated in Table 2, was incorporated in the test as a reference. The average thicknesses of the individual layers in each sample are given in Table 4, row 3, while the total average thickness of the sample is given in Table 4, row 4. For each structure (G, H and I), multiple samples were tested and the presented results represent an average of the results obtained for each of the samples.

TABLE 4

| Parameter | Unit | G | H | I |
| --- | --- | --- | --- | --- |
| Density | [g/cm$^3$] | 1.20 | 0.81 | 0.87 |
| Thickness (Skin1-Core-Skin2) | [mm] | — | 1.5-9.0-1.1 | 2.6-6.0-1.9 |
| Thickness (Total) | [mm] | 7.6 | 11.5 | 10.5 |
| Average distance travelled by jig-saw | [mm] | 12.98 | 16.48 | 15.63 |

Conclusion:

From Table 4, it is clear that the jig saw proceeds significantly easier through three-layered samples H and I as compared to mono-layered skin sample G. Therefore, three-layered products as produced according to the methods of the present invention have an improved workability.

3.2 Screwing Test

In the Screwing test, the time to completely screw a typical fiber cement screw (such as a self-drilling screw to fix fiber cement sidings, such as sidings of the Cedral range; screw length 45 mm; screw diameter 4.2 mm) in a sample is measured by applying a weight of 5 kg on a column drill (BDS Maschinen, MAB 485, speed 2).

The screwing tests were performed on three-layered samples L, M, N (each consisting of two outer skin layers and one inner core layer), which samples have one inner core and two outer skin surface layers, with compositions as indicated in Table 2. Also, a mono-layer skin surface material sample K, completely consisting of the skin surface layer composition as indicated in Table 2, was incorporated in the test as a reference. The average thicknesses of the individual layers in each sample are given in Table 5, row 3, while the total average thickness of the sample is given in Table 5, row 4. For each structure (K, L, M, N), multiple samples were tested and the presented results represent an average of the results obtained for each of the samples.

TABLE 5

| Parameter | Unit | K | L | M | N |
| --- | --- | --- | --- | --- | --- |
| Density | [g/cm$^3$] | 1.20 | 0.81 | 0.93 | 0.87 |
| Thickness (Skin1-Core-Skin2) | [mm] | — | 1.4-8.2-1.0 | 2.6-6.6-2.5 | 2.6-5.9-1.9 |
| Thickness (Total) | [mm] | 7.4 | 10.6 | 11.7 | 10.4 |
| Average time to insert screw completely in sample | [s] | 25.68 | 10.44 | 20.9 | 8.26 |

Conclusion:

From Table 5, it is clear that a screw proceeds significantly faster through three-layered samples L, M, N as compared to mono-layered skin sample K. Therefore, it can again be concluded that the three-layered products as produced according to the methods of the present invention have an improved workability.

Example 4: Production of Fiber Cement Sheets According to a Specific Embodiment of the Invention Twenty-three different structures of three-layered fiber cement sheets (samples 10 to 32) were produced according to the methods of the invention. Each three-layered structure consisted of two fiber cement Hatschek skin (medium- to high-density) layers (also referred to herein as "skin outer surface layer 1" and "skin outer surface layer 2") and one inner (low-density) non-Hatschek core layer (see Table 9). In addition, nine different reference structures were prepared (samples 1 to 9) exclusively consisting of medium- to high-density skin layer material (see Table 6). For each structure (each of samples 1 to 32), multiple samples were tested and the obtained results represent an average of the results obtained for each of the samples.

Table 6 shows the density and composition of the different skin layer materials A, B, and C used to create samples 1 to 32.

Table 7 shows the density and composition of the different core layer materials D, E, F, G, H, and I used to create samples 1 to 32.

Table 8 shows the layer composition of reference samples 1 to 9.

Table 9 shows the specific layer composition of three-layered samples 10 to 32.

TABLE 6

| | Skin outer surface layers | | |
| --- | --- | --- | --- |
| | A | B | C |
| | (Density: 1.28 g/cm$^3$) | (Density: 1.25 g/cm$^3$) | (Density: 1.20 g/cm$^3$) |
| Component | Relative weight compared to total weight of dry matter components (weight %) | | |
| Cellulose (Tasman grade K25) | 8.00 | — | — |
| Bleached Softwood Kraft Pulp | — | 9.00 | 9.00 |

TABLE 6-continued

| | Skin outer surface layers | | |
|---|---|---|---|
| | A (Density: 1.28 g/cm³) | B (Density: 1.25 g/cm³) | C (Density: 1.20 g/cm³) |
| Component | Relative weight compared to total weight of dry matter components (weight %) | | |
| Cement | 36.80 | 36.40 | 32.40 |
| Quartz | 55.20 | 54.60 | 48.60 |
| Slaked lime (Ca(OH)$_2$) | — | — | 10.00 |
| TOTAL | 100.00 | 100.00 | 100.00 |

TABLE 7

| | Core inner layers | | | | | |
|---|---|---|---|---|---|---|
| | D (Density: 0.57 g/cm³) | E (Density: 0.70 g/cm³) | F (Density: 0.65 g/cm³) | G (Density: 0.71 g/cm³) | H (Density: 0.75 g/cm³) | I (Density: 0.65 g/cm³) |
| Component | Relative weight compared to total weight of dry matter components (weight %) | | | | | |
| Cellulose (Tasman) | 4.00 | — | 4.00 | — | — | — |
| Cellulose (pulp from recycled corrugated cardboard) | — | 4.00 | — | 4.00 | 4.00 | 4.00 |
| Expanded perlite | 40.00 | 30.00 | 30.00 | 30.00 | 30.00 | 30.00 |
| Cement | 22.40 | 26.40 | 26.40 | 26.40 | 18.40 | 18.40 |
| Quartz | 33.60 | 39.60 | 39.60 | 39.60 | 27.60 | 27.60 |
| TOTAL | 100.00 | 100.00 | 100.00 | 100.00 | 100.00 | 100.00 |

TABLE 8

| | Layer Skin outer surface layer | | |
|---|---|---|---|
| | A | B | C |
| Sample No. | Layer thickness (mm) | | |
| 1 | 7 | — | — |
| 2 | 8 | — | — |
| 3 | 9 | — | — |
| 4 | — | 7 | — |
| 5 | — | 8 | — |
| 6 | — | 9 | — |
| 7 | — | — | 7 |
| 8 | — | — | 8 |
| 9 | — | — | 9 |

TABLE 9

| | Layer | | | | | | | | | | |
|---|---|---|---|---|---|---|---|---|---|---|---|
| | Skin outer surface layer 1 | | | Core inner layer | | | | | Skin outer surface layer 2 | | |
| | A | B | C | D | E | F | G | H | I | A | B | C |
| Sample No. | Layer thickness (mm) | | | Layer thickness (mm) | | | | | | Layer thickness (mm) | | |
| 10 | 5 | — | — | 4 | — | — | — | — | — | 5 | — | — |
| 11 | 5 | — | — | 5 | — | — | — | — | — | 5 | — | — |
| 12 | 7 | — | — | 4 | — | — | — | — | — | 7 | — | — |
| 13 | 7 | — | — | 5 | — | — | — | — | — | 7 | — | — |
| 14 | 5 | — | — | — | 4 | — | — | — | — | 5 | — | — |
| 15 | 5 | — | — | — | 5 | — | — | — | — | 5 | — | — |
| 16 | 5 | — | — | — | 6 | — | — | — | — | 5 | — | — |
| 17 | 7 | — | — | — | 4 | — | — | — | — | 7 | — | — |
| 18 | 7 | — | — | — | 5 | — | — | — | — | 7 | — | — |
| 19 | — | 5 | — | — | — | 5 | — | — | — | — | 5 | — |
| 20 | — | 5 | — | — | — | 6 | — | — | — | — | 5 | — |
| 21 | — | 5 | — | — | — | 7 | — | — | — | — | 5 | — |
| 22 | — | 7 | — | — | — | 4 | — | — | — | — | 7 | — |

TABLE 9-continued

| | Layer | | | | | | | | | | | |
|---|---|---|---|---|---|---|---|---|---|---|---|---|
| | Skin outer surface layer 1 | | | Core inner layer | | | | | | Skin outer surface layer 2 | | |
| Sample No. | A Layer thickness (mm) | B | C | D | E Layer thickness (mm) | F | G | H | I | A Layer thickness (mm) | B | C |
| 23 | — | 5 | — | — | — | — | 4 | — | — | — | 5 | — |
| 24 | — | 5 | — | — | — | — | 5 | — | — | — | 5 | — |
| 25 | — | 5 | — | — | — | — | — | 5 | — | — | 5 | — |
| 26 | — | 5 | — | — | — | — | — | 6 | — | — | 5 | — |
| 27 | — | 5 | — | — | — | — | — | 7 | — | — | 5 | — |
| 28 | — | 7 | — | — | — | — | 4 | — | — | — | 7 | — |
| 29 | — | 7 | — | — | — | — | 5 | — | — | — | 7 | — |
| 30 | — | — | 5 | — | — | — | — | — | 5 | — | — | 5 |
| 31 | — | — | 7 | — | — | — | — | — | 4 | — | — | 7 |
| 32 | — | — | 7 | — | — | — | — | — | 5 | — | — | 7 |

TABLE 10

| Sample No. | Weight (kg/m$^2$) | Force (N) |
|---|---|---|
| 1 | 8.9 | 254.8 |
| 2 | 10.2 | 338 |
| 3 | 11.5 | 427 |
| 4 | 9.3 | 355.4 |
| 5 | 10.0 | 409 |
| 6 | 11.3 | 517 |
| 7 | 8.4 | 272.7 |
| 8 | 9.6 | 353 |
| 9 | 10.8 | 447 |
| 10 | 8.6 | 299.53 |
| 11 | 9.7 | 393.83 |
| 12 | 10.7 | 490.21 |
| 13 | 11.6 | 591.13 |
| 14 | 8.4 | 260.67 |
| 15 | 10.7 | 385.84 |
| 16 | 9.9 | 396.8 |
| 17 | 9.5 | 383.92 |
| 18 | 11.5 | 503.09 |
| 19 | 9.9 | 459.93 |
| 20 | 10.0 | 481.8 |
| 21 | 11.2 | 591.76 |
| 22 | 10.4 | 530.46 |
| 23 | 9.6 | 358.78 |
| 24 | 9.7 | 354.85 |
| 25 | 11.1 | 477.1 |
| 26 | 11.5 | 485.23 |
| 27 | 12.2 | 579.8 |
| 28 | 11.0 | 523.26 |
| 29 | 11.9 | 644.2 |
| 30 | 8.5 | 307.79 |
| 31 | 7.3 | 291.45 |
| 32 | 7.1 | 277.7 |

The breaking force of the sheets ("Force" in Newton) presented in Table 10 was determined and presented in the graph of FIG. 2 in function of the weight in kg/m$^2$.

Figure 3:
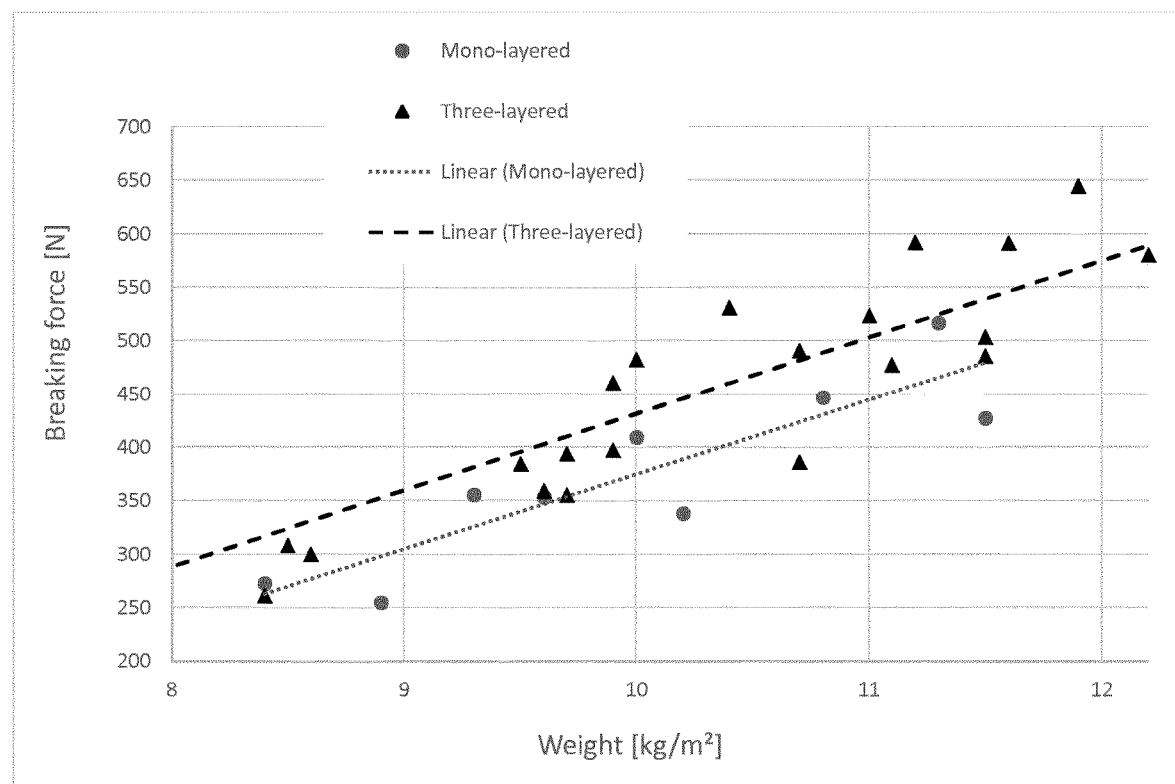
FIG. 3 shows the breaking force, which is needed to break multi-layered structures produced according to specific embodiments of the methods of the invention and a conventional monolayered structure in function of the weight in kg/m$^2$.

From FIG. 3, it is clear that the force, which is needed to break the sheets in function of the weight is increased in the three-layered structures 10 to 32 versus the monolayered reference structures 1 to 9. Indeed, when comparing a three-layered structure of the invention with a mono-layered reference structure having approximately the same weight (see e.g. three-layered sample 20 versus mono-layered reference sample 5), the force needed to break the board is significantly increased for the three-layered sample (i.e. 481, 8 N for sample 20 compared to 409 N for reference sample 5).

This means that the relative mechanical strength (i.e. as a function of the density) of a multi-layered sheet of the present invention is increased compared to the relative mechanical strength of conventional monolayered fiber cement sheets.

The invention claimed is:

1. A method for producing a fiber cement product comprising an inner core covered by at least one outer surface layer,
   wherein said inner core has a density of between about 0.4 and about 0.9 g/cm$^3$ inclusive, and
   wherein said at least one outer surface layer has a density of between about 0.9 and about 1.4 g/cm$^3$ inclusive,
   wherein said method comprises the steps of:
   i) providing a first cementitious material comprising cement and between 1 wt % and 70 wt % with respect to a total dry weight of said inner core of a lightweight filler,
   ii) providing a second fiber cement material comprising fibers and cement,
   iii) assembling said first cementitious material and said second fiber cement material to obtain a fiber cement product comprising an inner core made of said first cementitious material, which inner core is covered by at least one outer surface layer made of said second fiber cement material, and
   iv) curing said fiber cement product,
   wherein in steps (i) and (ii), a fiber cement slurry is prepared followed by forming one or more uncured fiber cement layers from said fiber cement slurry according to a Hatschek formation process and/or a flow-on process,
   wherein the at least one outer surface layer is formed according to the Hatschek formation process and is a Hatschek layer,
   wherein the inner core is formed according to a flow-on process comprising a fiber cement distribution step of discharging a fiber cement slurry composition onto a forming surface, resulting in an uncured non-Hatschek layer, and
   wherein in step (iii), the first cementitious material and second fiber cement material are assembled by superimposing an uncured non-Hatschek layer onto another layer during the fiber cement distribution step.

2. The method according to claim 1, wherein said step (i) comprises providing a first cementitious material comprising cement and between 15 wt % and 70 wt % with respect to the total dry weight of said first cementitious material of expanded perlite.

3. The method according to claim 1, wherein said fibers in said at least one outer surface layer comprise cellulose fibers.

4. The method according to claim 1, wherein said first cementitious material further comprises fibers.

5. The method according to claim 1, wherein forming the one or more uncured fiber cement layers according to the flow-on process comprises a fiber distribution step of discharging a fiber cement slurry composition onto a forming surface.

6. The method according to claim 5, wherein the forming surface is a felt transport belt.

7. The method according to claim 6, wherein said felt transport belt is a felt transport belt of a Hatschek machine.

8. The method according to claim 5, wherein said fiber cement slurry composition is discharged by one or more spraying systems and/or one or more spattering devices.

9. The method according to claim 8, wherein said one or more spattering devices are agitated brush systems.

10. The method according to claim 1, wherein in step (iii), the first cementitious material and second fiber cement material are assembled by superimposing an uncured Hatschek layer onto another layer during the Hatschek formation step.

11. The method according to claim 10, wherein the Hatschek layer is superimposed onto the other layer during an accumulation step of the Hatschek formation step, whereby the Hatschek layer being formed is wrapped around one or more previously-formed uncured layers already wound onto an accumulator roll.

12. The method according to claim 1, wherein the uncured non-Hatschek layer is formed by discharging a fiber cement slurry onto an endless transport belt, with previously-formed uncured Hatschek or uncured non-Hatschek layers present on the transport belt.

13. The method according to claim 1, wherein the uncured non-Hatschek layer is wrapped or accumulated onto an accumulator roll, onto which previously-formed uncured Hatschek or uncured non-Hatschek layers are already wound.

14. The method according to claim 1, wherein in step (iv), the curing step is autoclave-curing.

15. The method according to claim 1, wherein the fiber cement product comprises at least one inner core layer and at least two outer surface layers.

16. The method according to claim 15, wherein the fiber cement product comprises a first and a second inner core layer mutually separated by a Hatschek layer.

* * * * *